United States Patent

[11] 3,558,896

[72] Inventor James C. Daly
Middletown, N.J.
[21] Appl. No. 756,273
[22] Filed Aug. 29, 1968
[45] Patented Jan. 26, 1971
[73] Assignee Bell Telephone Laboratories, Incorporated
Murray Hill, N.J.
a corporation of New York

[54] OPTICAL GUIDING APPARATUS WITH AUTOMATIC CONTROL OF BEAM POSITION
8 Claims, 5 Drawing Figs.

[52] U.S. Cl. .......... 250/208, 250/201, 350/54, 350/96, 356/152
[51] Int. Cl. .......... H01j 39/07, G01j 1/36, H01j 39/10
[50] Field of Search .......... 250/201, 208, 199; 350/96, 54; 356/152

[56] References Cited
UNITED STATES PATENTS
3,316,800 5/1967 Kibler .......... 356/152
3,442,574 5/1969 Marcatili .......... 350/179
3,466,111 9/1969 Ring .......... 350/96X

*Primary Examiner*—James W. Lawrence
*Assistant Examiner*—V. Lafranchi
*Attorneys*—R. J. Guenther and Arthur J. Torsiglieri

ABSTRACT: In the optical guiding apparatus disclosed, the optical beam is guided and focused by solid lenses which are automatically positioned with respect to a reference axis established by the sensors. Fixed relative positioning of the sensors permits the movement of the lenses in a small number of discrete steps, each step being substantially equal to a threshold position error of a control loop.

In a first embodiment, each sensor controls a plurality of beam-positioning lenses collectively to provide the downstream beam position correction. Two-position control and three-position control are employed.

In second and third embodiments, each sensor effects compensating movements of upstream and downstream lenses to modify the beam position only locally.

FIG. 1 CONFOCAL GUIDE

INVENTOR
J. C. DALY
BY Wilford L. Wisner
ATTORNEY

CONFOCAL GUIDE

NON-CONFOCAL GUIDE

OPTICAL GUIDING APPARATUS WITH AUTOMATIC CONTROL OF BEAM POSITION

BACKGROUND OF THE INVENTION

This invention relates to optical guiding apparatuses in which the beam position is automatically controlled.

Communication employing modulated laser beams is the subject of a substantial amount of theoretical and applied research. The potential communication bandwidth possessed by coherent radiation in a light beam is much greater than the bandwidth of any existing communication facility. Gradually, many components usable in a communication system employing coherent light have been discovered and investigated.

One of the persistent problems remaining as an obstacle to feasible optical communication systems is the lack of a sufficiently reliable transmission system for the modulated optical beam. In unguided transmission systems, snow, rain and fog degrade transmission reliability. In guided transmission, earth movements and variations in ambient temperature gradients can also degrade transmission reliability. In this context, guided transmission refers to protected transmission in an enclosing conduit, and does not imply operation analogous to that of a microwave waveguide. Typically, the transverse dimensions of the conduit are many times the wavelength of light being transmitted. Reflections at the conduit walls are generally undesirable because sufficiently smooth internal surfaces would be too costly. As a result, many arrangements have been proposed for keeping the beam away from the conduit walls, even in the presence of disturbances.

One of these arrangements is described in the article "Self-Aligning Optical Beam Waveguides" by Messrs. Christian, Goubau and Mink, IEEE Journal of Quantum Electronics, QE3, p. 498 (Nov., 1967). In that arrangement, the sensors, when in their sensing position, are symmetrically arranged with respect to the optical center of a lens at essentially the same axial position. Further, in the correction process the positions of each lens and its associated sensors are changed together to maintain a fixed relationship to each other. The purported advantages of such an arrangement are that slight earth movements will be exactly compensated, maintaining the original lens alignment, and that the alignment procedure "does not require knowledge of the individual lens displacement."

Nevertheless, such an arrangement requires numerous repetitions of the correction process to correct a single beam position error. Repetitions are required because each set of sensors controls the position of a preceding lens and a preceding set of sensors. Thus, each correction, however small, produces an apparent beam position error with respect to that preceding set of sensors, even though no beam position error actually existed at that axial position theretofore. In other words, such an arrangement creates a backward propagating wave of apparent errors which unduly complicates and lengthens the correction process. It should be apparent that such an arrangement is unduly slow for many practical applications.

In an optical communication system, the system does not need to compensate completely for all earth movements by maintaining the original alignment of the beam. It is merely necessary to keep the beam away from the guide walls regardless of whatever disturbances occur. If that condition is satisfied, large changes in the alignment of the protective conduit and the beam can be tolerated.

Moreover, in an optical communication system, the conduit would typically be buried deeply in the earth and thus need high reliability. For example, the lenses should be locked or latched into position in the event of power failure. I have recognized that this objective is difficult to obtain when the lenses are movable in a large number of small steps as in the arrangement of the above-cited art.

SUMMARY OF THE INVENTION

According to my invention, an optical guiding apparatus is adapted for use in a communication system by fixing the sensors with respect to the conduit, and moving the beam-positioning elements, for example lenses, in discrete steps that are substantially equal to the position error threshold of the control circuitry. Approximate corrections are thereby quickly and reliably established without backward propagating waves of error signals.

According to a first feature of my invention, each lens can occupy only two or three discrete positions with respect to the conduit. Thus, the position drive apparatus for the lens can employ relay-type apparatus that will latch into position in the event of power failure.

According to another feature of my invention, a larger position error than that requiring just one step of movement of one lens or positioning element is applied to produce coordinated step movements of a plurality of lenses. Thus, the needed correction can be divided along a series of lenses preceding the error-detecting set of sensors. Since the movement of each lens can thus still produce only two or three discrete lens positions, fail-safe latch-in properties are compatible with a capability for correcting large beam position errors.

According to another highly significant feature of my invention, beam position corrections can be localized, not only to prevent backward-propagating waves of false error signals, but also to prevent forward-propagating waves of beam position errors. Specifically, each set of sensors is coupled to lenses preceding and following its associated lens to tend to drive those preceding and following lenses in like directions so that the beam positions at farther downstream or farther upstream points are not perturbed. For example, in a confocal guiding apparatus the movements of the preceding and following lens would be made equal if only one set of sensors has detected an error. In nonconfocal optical guiding apparatus, the associated lens is moved by a calculated amount in addition to the coordinated movements of the preceding and following lenses.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENT

Figure 1:
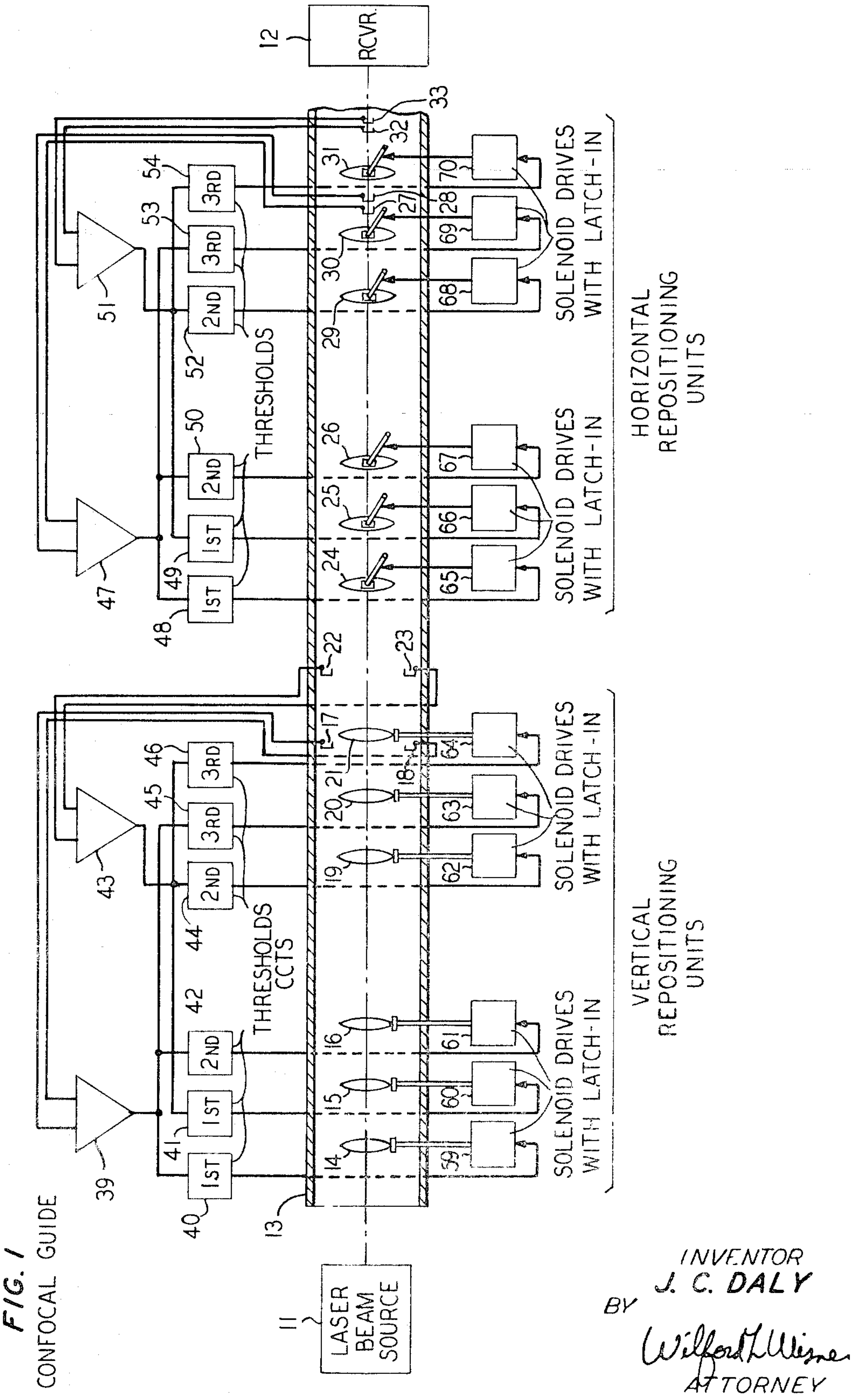
FIG. 1 is a partially schematic and partially block diagrammatic illustration of a first embodiment of my invention.

In FIG. 1, a communication system is illustrated in which it is desired to transmit a modulated laser beam from a source 11 to a receiver 12. To obtain reliable transmission of the laser beam over extended distances, it is desirable to transmit it through a pipe or conduit 13, illustratively copper, which has internal lateral dimensions many times the wavelength of the light beam transmitted. It is known that any light beam, even a laser beam, will gradually spread according to the laws of diffraction. Therefore, it is necessary periodically to refocus the laser beam so that it does not intercept the walls of conduit 13. In FIG. 1, antireflection-coated glass lenses, for example, lenses 14 through 16, 19 through 21 and so forth, are illustratively used for this purpose. They are mounted (by means illustrated in detail in FIG. 4) for lateral movement with respect to conduit 13, in order to modify the position of the beam at points in the guide downstream from the respective lenses. The general principles of such correction are set out in the copending application of E. A. J. Marcatili, Ser. No. 487,677, filed Sept. 16, 1965 and assigned to the assignee hereof, and which is now U.S. Pat. No. 3,442,574 granted May 6, 1969.

In an arrangement characteristic of one feature of my invention, sensors 17 and 18 control the positions of three of the preceding lenses 14, 16 and 20 which are capable of vertical movement only upon their movable mounts. Further, the arrangement of FIG. 1 takes advantage of the principle that an optical beam not centered with respect to the lenses will tend to oscillate about the common axis of the lenses. Thus, an error which cannot be fully corrected at the first set of sensors because of limited lens movement becomes an error of the opposite sign at downstream sensors, so that lens movements for further correction need not all be toward one side of the guide.

The next set of sensors 22 and 23 is coupled to lenses 15, 19, and 21 also to control the vertical position of the beam. Lenses 15, 19, and 21 are also mounted for movement between two vertical positions each.

Similarly, in a first horizontal repositioning unit, a sensor 28 illustratively disposed away from the axis of conduit 13 toward the viewer and a sensor 27 disposed away from the viewer, detects a horizontal position error and controls lenses 24, 26, and 30 which are mounted upon horizontally movable mounts. The next sensors, 32 and 33, are also disposed horizontally about the guide axis in the line of sight of the viewer and detect those horizontal position errors not detected by sensors 27 and 28. They control lenses 25, 29, and 31.

Thus we see that two vertical positioning units are followed by two horizontal positioning units. The sequence of repositioning units may be assumed to repeat itself an indefinite number of times. The sensor signals from each pair of sensors, such as sensors 17 and 18, are processed to generate an error signal, for example, in difference amplifier 39. The output of amplifier 39 is applied through threshold circuits 40, 42, and 45 to the solenoid drives 59, 61 and 63 which move the lenses. Illustratively, circuits 40, 42, and 45 may provide correction thresholds of differing values. Each other pair of sensors is similarly coupled to drive a plurality of lenses.

Figure 4:
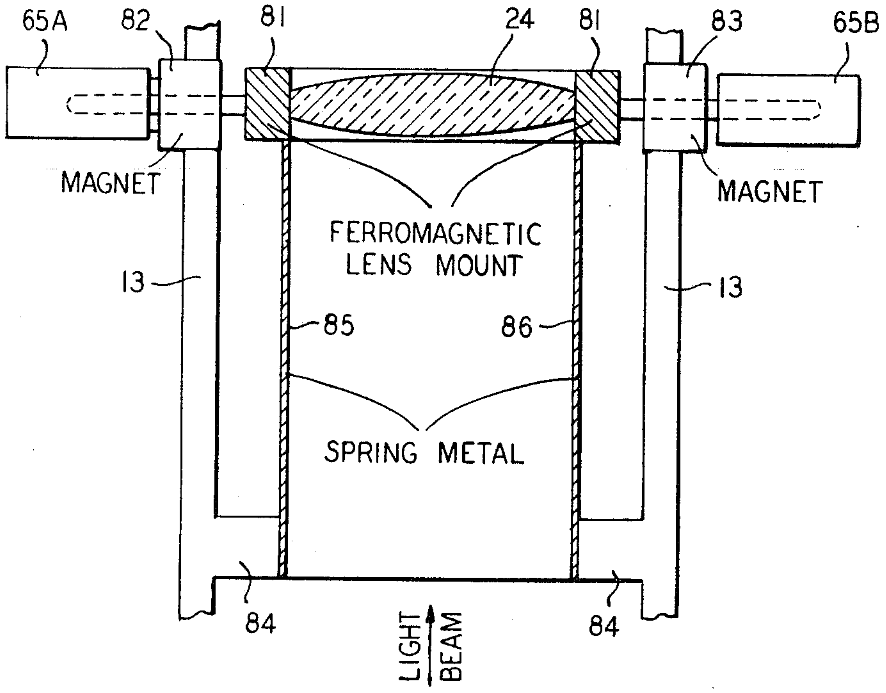
FIG. 4 is a pictorial, partially sectioned illustration of an apparatus for two-position control of a lens.

In more detail, the organization of a repositioning unit according to my invention, is adapted as illustratively shown in FIG. 4 to permit movement of each lens up and down or back and forth between only two discrete positions. Let us assume that FIG. 4 is a plan view (top view) of the guide of FIG. 1 at lens 24. Thus, in FIG. 4, a horizontally movable ferromagnetic lens mount 81 is driven by solenoids 65A and 65B, which correspond to the schematically shown solenoid drive 65 of FIG. 1. Such a solenoid drive illustratively provides a step of movement substantially equal to $(f/d)$ times the positioning error needed to exceed the respective threshold of the threshold circuit, for example, circuit 48, from which they are respectively energized, where $f$ is the focal length of the lens and $d$ is the distance from the lens to the corresponding sensors.

In more detail, the lens mount 81 is a ring of ferromagnetic material and is held in either of the two positions by magnetic latching. That is, it can be latched to permanent magnet 82 by energizing solenoid 65A; and it can be latched to permanent magnet 83 by energizing solenoid 65B. The housing on which magnets 82 and 83 are mounted is a part of the conduit 13 of FIG. 1.

Flanges 84 of the conduit 13 extend inwardly toward the axis to provide rigid mounting points for two sheets 85 and 86 of spring metal. These spring metal sheets 85 and 86 are essentially planar and orthogonal to the direction of intended motion transverse to conduit 13 and extend along the line of sight toward the conduit walls, just far enough so that they resist motion in any direction except the intended direction. The ferromagnetic lens mount 81 is mounted on the free ends of spring metal sheets 85 and 86. The force exerted on mount 81 by spring metal sheets 85 and 86 is much less than the force that is exerted by solenoids 65A and 65B when energized.

In the operation of the two-state mechanism of FIG. 4, only one of the solenoids 65A and 65B is actuated from the threshold circuit 48 of FIG. 1, for a given error signal. Thus, conventional diode logic (not shown) routes a positive error signal to one of the solenoids that will produce movement in the appropriate sense (which we may call negative). And a negative error signal is routed to the other solenoid to produce a positive movement. In either case, once the lens mount has been driven by solenoid 65A to latch to magnet 82 or by solenoid 65B to latch to magnet 83, it remains there until driven in the opposite sense by the other solenoid.

Thus, although the mount 81 is shown in FIG. 4 not latched, for convenience of illustration, it can never occupy such an intermediate position in practice.

The other solenoid drives in horizontal repositioning units in FIG. 1 are also arranged as shown in FIG. 4, except some require a different-sized error to be moved and move by a corresponding different amount.

The organization of the vertical repositioning units is precisely analogous to the horizontal repositioning units except for the direction of lens movement.

The difference amplifiers 39, 43, 47, and 51 and threshold circuits 40, 41, 42 and so forth, are of types conventional in the electronic art; and the sensors 17, 18, 22, 23, 27, 28, 32 and 33 may be photoconductive diodes backed by substantially transparent plates (not shown) intercepting the beam and reflecting only a small portion of it toward the diodes. Typically, these plates would be curved and oriented to concentrate the reflected radiation of a properly positioned beam upon the corresponding diode.

In the operation of the two-state solenoid drive of FIG. 4 in cooperation with the apparatus of FIG. 1, the limitation of each lens to two transverse positions requires that larger corrections needed at a set of sensors, for example, the sensors 17 and 18, must be distributed among three controlled preceding lenses 14, 16 and 20. Thus, it may be convenient to proportion the thresholds of circuits 40, 42 and 45 so that they decrease in a geometric progression: 4:2:1 and that lenses 14, 16 and 20 are permitted to experience steps of movement having the same progression.

Assume that lens 20 has already moved downward to attempt to correct an undesired upward deflection of the light beam at sensors 17 and 18. If the condition of upward deflection of the beam continues to worsen, eventually the threshold of circuit 42 will be exceeded and lens 16 will be moved upward. For a very large total correction lens 14 may then be moved downward, with the result that then an error signal of opposite sense may be generated which will first move lens 20 upward and then, if necessary, also lens 16 downward.

Even with this cooperation, if the beam is still not properly positioned at sensors 17 and 18, the residual error may grow into a larger error at sensors 22 and 23, where it may be corrected.

Alternatively, a three-state mechanism may be incorporated into the solenoid drive apparatus to allow greater range and flexibility of correction. Nevertheless, it is desirable to maintain a lock-in operation which will insure fail-safe characteristics if the electrical power to the solenoid should be interrupted.

Figure 5:
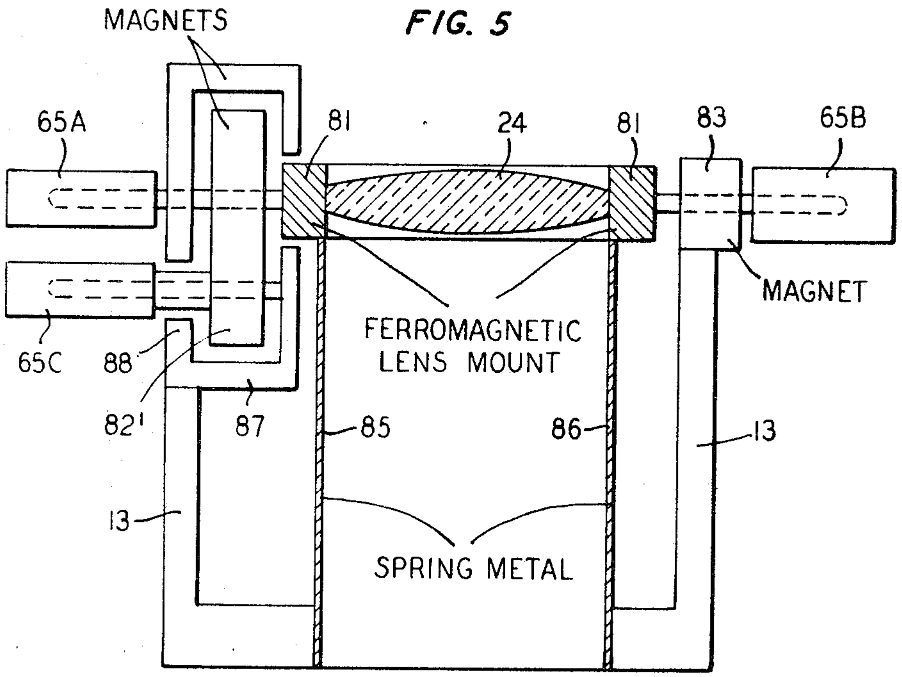
FIG. 5 is a pictorial, partially sectioned illustration of an apparatus for three-position control of a lens.

Such a latching-type, fail-safe three-state solenoid drive is shown in FIG. 5. The lens 24 can now occupy three transverse positions. The lens 24 is again mounted in a ring 81 of ferromagnetic material and is supported by sheets 85 and 86 of spring metal. It is mounted in a similar manner to that of FIG. 4 within conduit 13 and can be latched to either magnet 82′ or 83 as in FIG. 4. The main difference from the arrangement of FIG. 4 is that the magnet 82′ itself may be driven by solenoid 65C from one possible position within the auxiliary housing 87 to another. The first state, or transverse position, is obtained when mount 81 is resting against the stationary magnet 83. Magnet 83 does not move. The second state, or transverse position, is obtained by actuating solenoid 65C to drive magnet 82′ to the right where it latches against the ferromagnetic housing 87. To move mount 81 to the second position, latched against magnet 82′, solenoid 65A is actuated. Thus, position 2 corresponds to simultaneous actuation of solenoid 65A and 65C. State, or transverse position, 03 is obtained by actuating solenoid 65A alone. A force is exerted on mount 81, which in turn pushes on magnet 82′; and both move to the left. Magnet 82′ latches on a magnetic portion 88 of conduit wall 13. The required actuation of solenoids 65A, 65B and 65C in response to appropriate magnitudes of polarity of signals from the threshold circuit 44 can be obtained by conventional diode logic (not shown).

Four-state, fail-safe operation could be obtained by duplicating the left-hand structure of FIG. 5 on the right-hand side of the arrangement.

Figure 2:
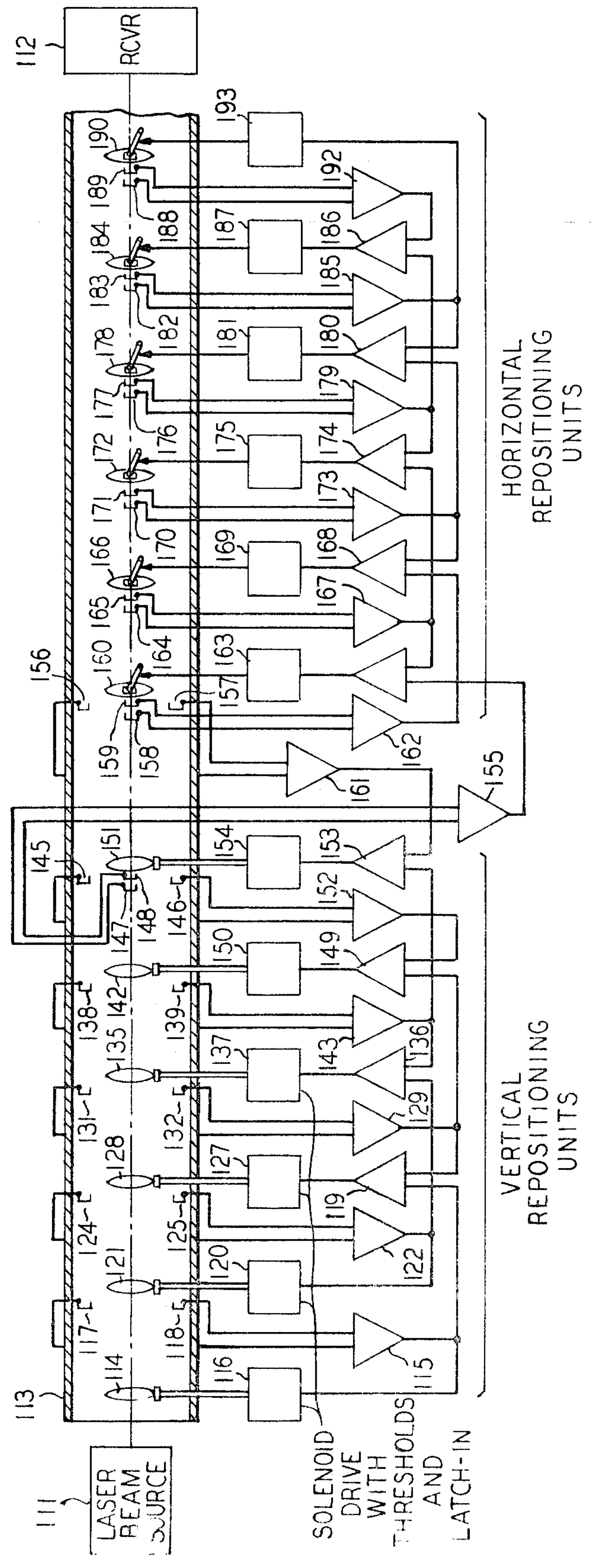
FIG. 2 is a partially schematic and partially block diagrammatic illustration of my invention employed to provide localized corrections in a confocal guide.

In the embodiment of FIG. 2, a very important new effect is achieved. Namely, the transients that result from lens movement are localized by moving lenses both before and after the associated sensors in appropriate fashion.

Although in practice this embodiment could also incorporate all the features of the embodiment of FIG. 1, each set of sensors would be assumed to control only one preceding lens and the one following lens with respect to the direction of light beam propagation, for the sake of simplicity of illustration of the new effect.

Thus, the signals from sensors 117 and 118 are processed and the resultant signal applied by a difference amplifier 115 in parallel to the solenoid drive 116, which may be assumed to be a combination of a threshold circuit and a solenoid drive of the type employed in FIG. 1, and to the difference amplifier 119, the output of which is coupled through solenoid drive 127 to a lens 128. All of the solenoid drives have similar characteristics. It will be noted that the sensors 117 and 118 are nearly in the plane of a lens 121, which is between lenses 114 and 128. The other input of difference amplifier 119 is connected to the output of a difference amplifier 129 which responds to the signals from sensors 131 and 132, which are nearly in the plane of the lens 135.

Similarly, sensors 124 and 125 are coupled to control the positions of both lenses 121 and 135. Similar connections are illustratively employed throughout a series of vertical positioning units. If horizontal positioning control starts with lens 160, for example, a set of four photodiodes 145, 146, 147 and 148 must be employed near the plane of the preceding lens 151 and a set of four diodes 156, 157, 158 and 159 must also be employed near the plane of lens 160, since the preceding lens 151 still requires vertical control signals.

It will be seen that a solenoid drive, such as drive 127, must in the typical case be driven through a difference amplifier 119 which responds to the output signals of two difference amplifiers 115 and 129 which are coupled to the sensors preceding and following the plane of the controlled lens 128. Similar connections are required throughout the system so that a particular lens can be made responsive to sensors both preceding and following it. Although these interconnections produce a somewhat complicated-appearing arrangement, the concept of coordinated corrections to localize transients is actually relatively simple.

The operation of the embodiment of FIG. 2 may be explained as follows. Assume that the light beam in the vicinity of lens 121 is too high in the guide, as sensed by sensors 117 and 118. A signal is applied through difference amplifier 115 to solenoid 116 to move the lens 114 downward. Let us assume that no error had previously been sensed in the vicinity of lenses 128 or 135. Because consecutive lenses are confocally disposed, the downward movement of lens 114 changes the slope of the beam at lens 114 and moves the beam into proper position in the vicinity of lens 121 and sensors 117 and 118. This correction now causes the slope of the beam to be distinctly changed at the left surface of lens 128, whereas it is desired to maintain the preexisting beam slope and position at the right surface of lens 128. Thus, the signal from difference amplifier 115 is also applied through difference amplifier 119 to solenoid drive 121 to accommodate the required incremental change in beam slope and to move lens 128 downward to maintain essentially the preexisting situation beyond lens 128. In a confocal guide, lenses 114 and 128 are moved by the same amount in the same direction. No complicated calculation is necessary.

If the net result of these corrections produces a position error in the vicinity of sensors 131 and 132 which is below threshold for moving lenses 128 and 142, the correction is now complete and there are no further transients, as desired. This result should indeed be obtained if no further disturbances have occurred.

This sort of operation is in marked contrast to the mode of operation in previous optical guiding apparatuses, which frequently required adjustments of lenses up and down the entire guide and sometimes required multiple, iterative adjustments of all those lenses.

Let us now examine the case in which local disturbances occur both in the vicinity of lens 135 and in the vicinity of lens 121. One signal from sensors 117 and 118 will be applied through difference amplifier 115 to one input of difference amplifier 119; and another signal will be applied from sensors 131 and 132 through difference amplifier 129 to the other input of difference amplifier 119. In this case neither correction can be entirely isolated and lens 128 is moved to the optimum position determined by the signals applied to difference amplifier 119. My analysis shows that in the typical case the transients still will not propagate downstream beyond lens 142, which is moved to effect a compensating correction of the type described, nor upstream beyond lens 121, which was also moved to effect a compensating correction.

It is expected that these arrangements for localizing correction transients will simplify the construction and operation of optical guiding apparatuses, greatly reduce the duration of transients in the apparatus in response to a disturbance and produce greatly improved stability in the operation of the system. Moreover, such a system is readily adapted to two-position or three-position stepped control having latch-in and fail-safe characteristics.

Figure 3:
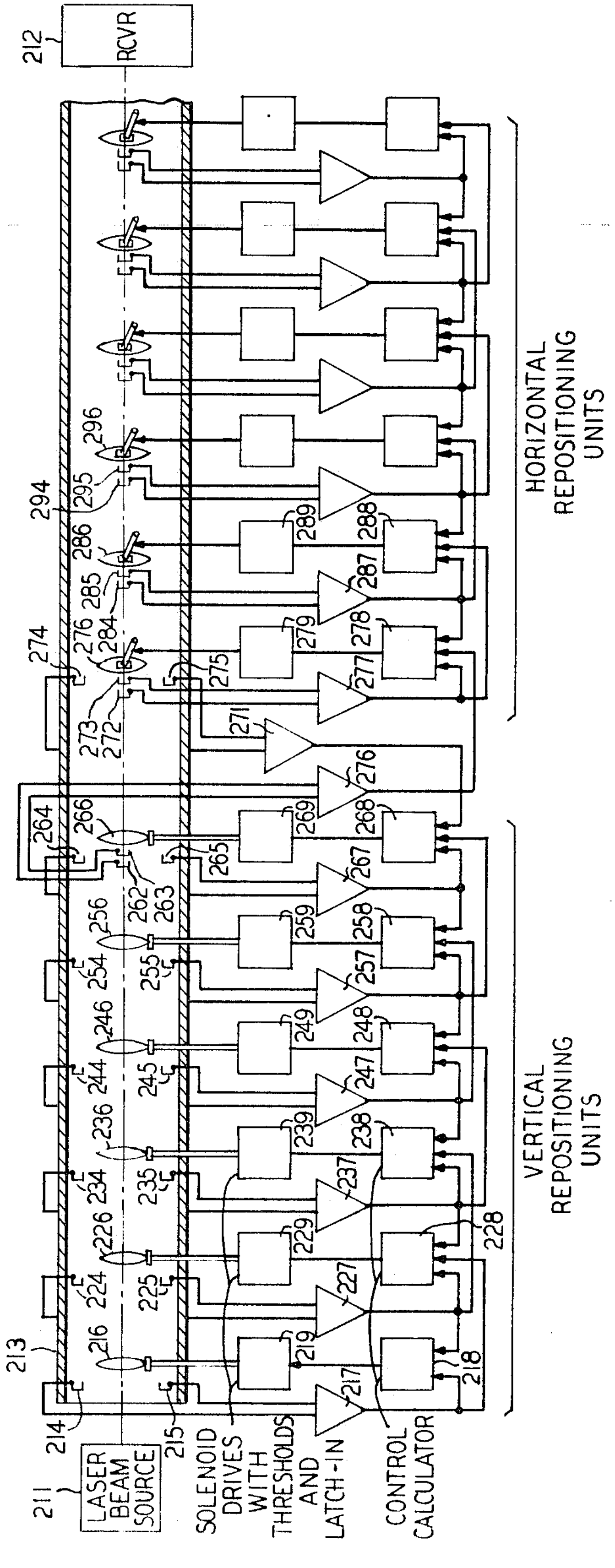
FIG. 3 is a partially schematic and partially block diagrammatic illustration of a modification of the embodiment of FIG. 2 for use with nonconfocal guiding apparatus.

A modification of the arrangement of FIG. 2 for localizing correction transients when some or all of the lenses are not exactly confocally disposed is illustrated in FIG. 3.

In FIG. 3 the lenses, sensors, difference amplifiers and solenoid drives (including threshold circuits) are all similar to the corresponding units of FIG. 2. The principal difference is that each solenoid drive 219, 229, 239, etc. is driven from a control calculator 218, 228 and 238, and so forth, which responds in the general case to signals from, first, the vicinity of the preceding lens, second, the vicinity of the controlled lens and, third, from the vicinity of the following lens. Conversely, each set of sensors, 214, 215, 224, 225, and so forth is coupled to three lenses, preceding, following, and the one nearest the plane of the sensors. This scheme of interconnection, which is entirely apparent from the drawing of FIG. 3, is required because localization of a transient in a system of nonconfocally disposed lenses requires some movement of the lens in the vicinity of sensors sensing the error in every case. The degree of movement required depends upon the precise spacing of the lenses and the thresholds associated with the various solenoid drives. Therefore, it is necessary to calculate the net movement required of each lens in a simple control calculator 218, 228, etc. which can be a readily available analogue or digital circuit. It should be particularly noted that nonconfocal disposition of the lenses will be particularly desirable in an optical communication system at points where the radius of curvature of the guide becomes smaller than that which is readily handled by confocal disposition of the particular lenses employed, which may for convenience of manufacture be all identical.

Illustratively, the equations for the control calculations for one type of nonconfocal systems are as follows:

$$D_n = -(d/f)\left[S_{n-1} + S_{n+1} + \left(\frac{d}{f} - 2\right)S_n\right]$$

where $d/f$ is the ratio of distance between lenses to the focal length of the lens, $D_n$ is the induced displacement of the controlled lens, $S_{n-1}$, $S_{n+1}$ and $S_n$ are the beam displacements at the preceding, following and controlled lenses respectively.

It should be apparent that many modifications may be implemented according to the principles of my invention, as set out above.

I claim:

1. An optical guiding apparatus of the type including a conduit of lateral dimensions substantially larger than the wave length to be transmitted, a plurality of optical elements disposed in said conduit and adapted to reposition an optical beam transmitted in said conduit, means for sensing the beam position in said conduit, and means responsive to said sensing means for adjusting said optical elements, said apparatus being characterized in that said adjusting means and said elements together are capable of movement between at most three discrete positions, said apparatus including means for latching said elements in any one of said positions, and said adjusting means is adapted for coordinating the movements of a plurality of said elements in response to a common signal from said sensing means.

2. An optical guiding apparatus according to claim 1 in which the adjusting apparatus includes a plurality of magnetic yokes in which the respective optical elements are mounted, said yokes being adapted for translational movement, and said adjusting apparatus includes magnetic means for latching said yokes in each of the aforesaid positions.

3. An optical guiding apparatus of the type including conduits of lateral dimensions substantially larger than the wave length to be transmitted, a plurality of optical elements disposed in said conduit and adapted to reposition and optical beam that is transmitted in said conduit, a plurality of means for sensing light beam position errors at a plurality of points in said conduit, and a plurality of means responsive to respective ones of said sensing means for adjusting one of said optical elements preceding said respective sensing means to correct a position error and for adjusting one of said optical elements following said respective sensing means to localize transients in the light beam position resulting from the error correction.

4. An optical guiding apparatus according to claim 3 in which the adjusting means and optical elements together are capable of movement between at most three discrete positions, said adjusting means including means for latching said elements in any one of said positions.

5. An optical guiding apparatus according to claim 3 in which the optical elements are confocally disposed lenses and the adjusting means is adapted to move ones of said lenses preceding and following the respective sensing means in the same sense to localize light beam position transients.

6. An optical guiding apparatus according to claim 3 in which the optical repositioning elements are nonconfocally disposed lenses and the adjusting means is adapted to move one of said lenses that is essentially in the same plane as the respective sensing means to supplement the movement of the following lens in localizing light beam position transients.

7. An optical guiding apparatus according to claim 6 in which the adjusting means and the lenses together are capable of movement between at most three discrete positions.

8. An optical guiding apparatus according to claim 5 in which the lenses and the adjusting means together are capable of movement among at most three discrete positions.